(12) United States Patent
Uehara

(10) Patent No.: US 7,021,766 B2
(45) Date of Patent: Apr. 4, 2006

(54) PROJECTOR

(75) Inventor: Katsuyuki Uehara, Misato-mara (JP)

(73) Assignee: Seiko Epson Corporation, Tokyo (JP)

( * ) Notice: Subject to any disclaimer, the term of this patent is extended or adjusted under 35 U.S.C. 154(b) by 14 days.

(21) Appl. No.: 10/895,350

(22) Filed: Jul. 21, 2004

(65) Prior Publication Data

US 2005/0057726 A1    Mar. 17, 2005

(30) Foreign Application Priority Data

Jul. 22, 2003    (JP)    ............................. 2003-199922

(51) Int. Cl.
 *G03B 21/14*    (2006.01)
(52) U.S. Cl. .............................. 353/20; 349/5; 353/37; 353/31
(58) Field of Classification Search .................. 353/20, 353/31, 33, 34, 37, 122; 349/5, 7, 8, 9, 117, 349/118, 119, 120; 345/32
See application file for complete search history.

(56) References Cited

U.S. PATENT DOCUMENTS

| 5,369,266 A | * | 11/1994 | Nohda et al. ............. 250/208.1 |
| 5,659,411 A | | 8/1997 | Nito et al. |
| 6,081,346 A | | 6/2000 | Terajima et al. |
| 6,184,969 B1 | * | 2/2001 | Fergason ..................... 349/196 |
| 6,407,726 B1 | * | 6/2002 | Endo et al. ................... 345/87 |

FOREIGN PATENT DOCUMENTS

| JP | A 7-36054 | 2/1995 |
| JP | A-7-64048 | 3/1995 |
| JP | A-10-83030 | 3/1998 |
| JP | A-2000-241897 | 9/2000 |
| JP | A-2001-209133 | 8/2001 |

\* cited by examiner

*Primary Examiner*—William C. Dowling
(74) *Attorney, Agent, or Firm*—Oliff & Berridge, PLC

(57) ABSTRACT

An object of the invention is to form a projecting image of smooth image quality inconspicuous in a joint in a stable state. With respect to image light passing through a second birefringent plate 28j set to a first state, an image light portion branched by a first birefringent plate 28i is further branched in the Y-direction. An image IM3 constructed by an original pixel PX0, a pixel PX2 corresponding to its branching image, and a black matrix area BA is formed on a screen. With respect to the image light passing through a second birefringent plate 28j set to a second state, the image light once branched by the first birefringent plate 28i is returned in the −Y direction. As this result, an image constructed by the black matrix area BA and an image provided by overlapping the branching image of the original pixel PX0 with the original pixel PX0 is formed on the screen. Namely, the same image IM3' as an original image IM1 is formed on the screen.

8 Claims, 11 Drawing Sheets

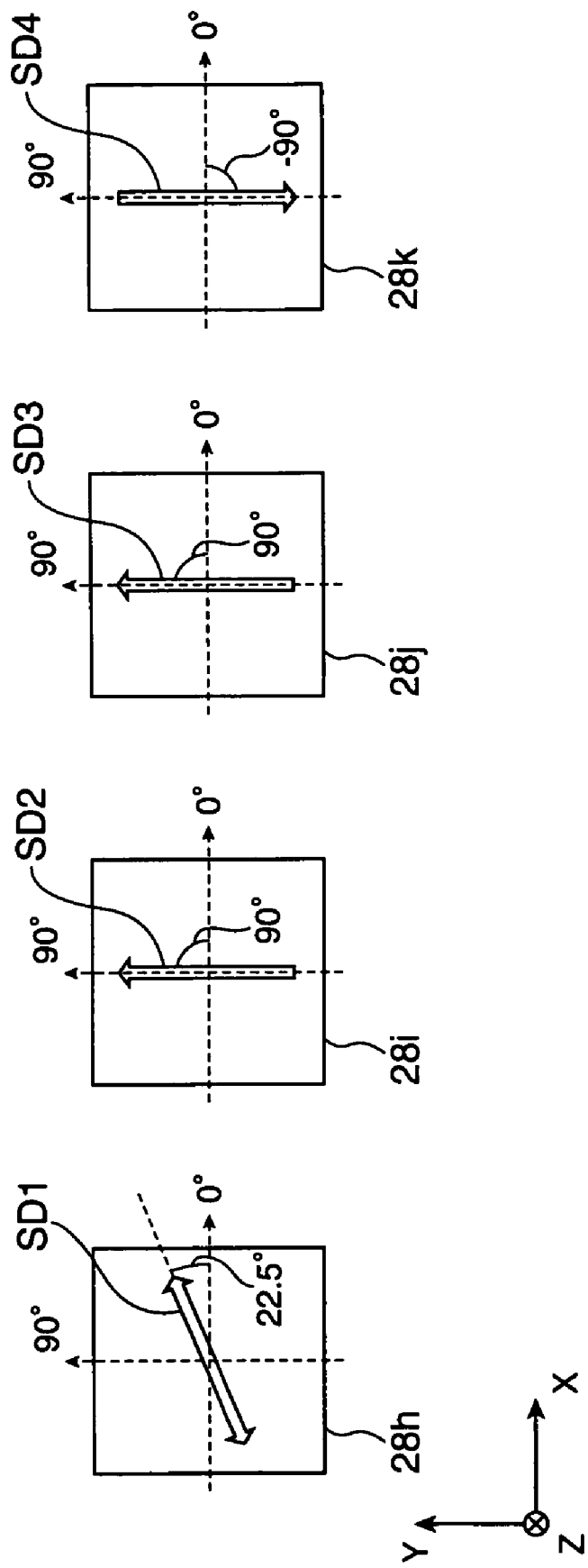

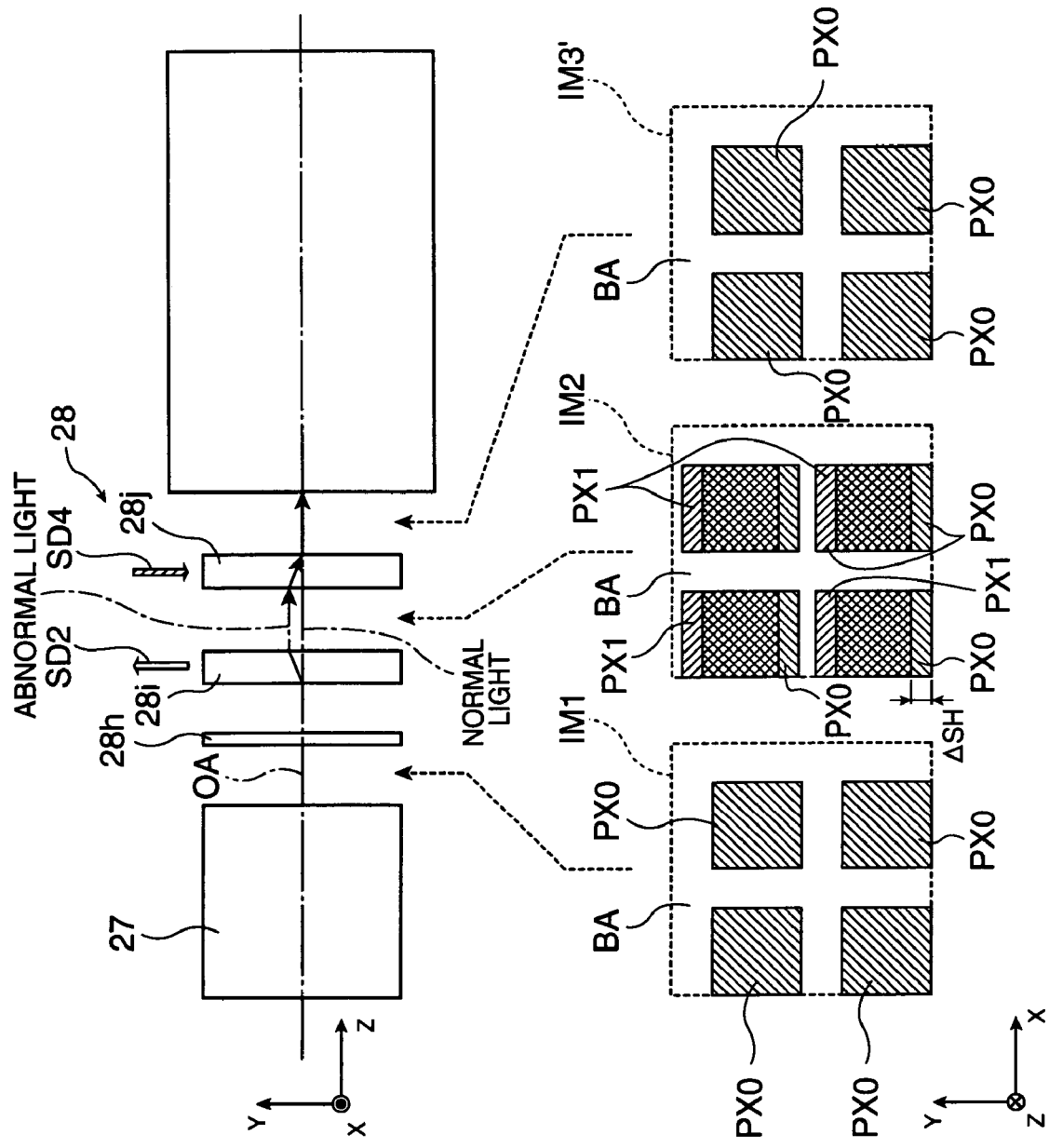

INCIDENCE: S-POLARIZED LIGHT
(OPTICAL PATHS R, B)

INCIDENCE: S-POLARIZED LIGHT
(OPTICAL PATH G)

PROJECTOR

BACKGROUND OF THE INVENTION

1. Field of Invention

Exemplary aspects of the present invention relate to a projector to project an image by using a liquid crystal display panel and other display elements.

2. Description of Related Art

A related art projector is assembled having a display element constructed by a discrete pixel, and an optical device of a structure laminating plural wobbling elements, each constructed by an optically transparent birefringent medium and an optically transparent phase modulating optical element of a switch type constructed by a ferroelectric liquid crystal, etc. See Japanese Patent Application No. 7-36054.

In such a projector, the polarizing direction of light passing through the birefringent optical element is alternately switched in the perpendicular direction by switching the operation of the phase modulating optical element within one frame. Thus, an optical path of the light emitted via the phase modulating optical element and the birefringent medium is switched within one frame and the clearance of a pixel can be buried. Accordingly, an image of the display element constructed by the discrete pixel can be projected as a continuous screen having no joint.

However, in the above projector, since the phase modulating optical element is switched and operated during one frame period, no stable operation of the phase modulating optical element can be easily secured, and the phase modulating optical element and its driving circuit become expensive. Otherwise, the obtained image tends to be unstable.

Further, in the above projector, no reduction in transmittance of a certain extent or more can be avoided and no generation of transmittance irregularities can be also avoided. Accordingly, a reduction in brightness of the projecting image and brightness irregularities are inevitably caused.

SUMMARY OF THE INVENTION

Therefore, exemplary aspects of the present invention provide a projector able to form a projecting image having smooth image quality and high resolution, being inconspicuous in the joint, being stable and being able to switch and display the projecting image.

Further, an exemplary aspect of the present invention provides a projector able to form a projecting image in which the brightness reduction and the brightness irregularities are small.

To address and/or solve the above and/or other problems, a projector in an exemplary aspect of the present invention includes a projecting optical system to form image light from a display device as an image; a first birefringent light branching element arranged so as to set a reference azimuth to a predetermined direction around a central axis of an incident light beam on a forward side of the display device; and a second birefringent light branching element having light branching characteristics corresponding to the first birefringent light branching element and arranged before or after the first birefringent light branching element, and able to be switched between a first state to set the reference azimuth to the predetermined direction around the central axis, and a second state to set the reference azimuth to a direction opposed to the predetermined direction by setting a rotating position around the central axis. Here, "the forward side of the display device" with respect to the arrangement of the first birefringent light branching element means a projecting optical system side of the display device and also means that the first birefringent light branching element is arranged on an optical path of the image light from the display device to the projecting optical system. Further, with respect to the arrangement of the second birefringent light branching element, "before or after the first birefringent light branching element" means a forward side or a backward side of the first birefringent light branching element, i.e., a projecting optical system side or a display device side of the first birefringent light branching element.

In the above projector, the state of the second birefringent light branching element having the light branching characteristics corresponding to the first birefringent light branching element can be switched between a first state to set the reference azimuth to the predetermined direction around the central axis, and a second state to set the reference azimuth to the direction opposed to the predetermined direction. Accordingly, in the first state, the image light from the display device can be branched by a double amount by cooperation of the first and second birefringent light branching elements in comparison with the case of one of the first and second birefringent light branching elements. For example, a case that the second birefringent light branching element is arranged adjacently to the forward side of the first birefringent light branching element is supposed. When light in the image light passes through the first birefringent light branching element as normal light, this light further passes through the second birefringent light branching element as the normal light. When light in the image light passes through the first birefringent light branching element as abnormal light branched in the predetermined direction, this light further passes through the second birefringent light branching element as the abnormal light branched in the same direction.

Accordingly, the abnormal light can be branched by a predetermined desirable position shift amount with respect to the normal light. In this case, it is not necessary to switch the polarizing plane of the image light incident to the first and second birefringent light branching elements for every frame. Accordingly, the branching state of the image light can be stably held. Specifically, even when the display device has a discrete pixel partitioned by a black matrix, etc., it is possible to cause a pixel shift to bury the clearance of the pixel by setting the characteristics of the first and second birefringent light branching elements. Thus, a continuous smooth image having no joint or an inconspicuous joint can be projected in a stable state. Further, it is possible to form a projecting image in which a brightness reduction and brightness irregularities are small.

When the second birefringent light branching element is set to the second state, the branch of the image light from the display device can be canceled by cooperation of the first and second birefringent light branching elements. Specifically, light in the image light, passing through the first birefringent light branching element as the normal light, also passes through the second birefringent light branching element as the normal light. Light in the image light, passing through the first birefringent light branching element as abnormal light branched in the predetermined direction, passes through the second birefringent light branching element as the abnormal light branched in the reverse direction. Accordingly, the abnormal light can be returned to the same optical path as the normal light as a result, and a state to dissolve the pixel shift is attained. When the above description is summarized, a projecting image of smooth image quality and a projecting image of high resolution can be displayed while these projecting images are switched in a stable state.

Further, in a projector of an exemplary aspect of the present invention, the display device is an optical modulator illuminated by illumination light from an illuminating device, and the optical modulator has a black matrix portion to limit emission of the image light in a periodic partial area. The first and second birefringent light branching elements are a birefringent plate having a thickness corresponding to the arrangement and the shape of the black matrix portion with respect to the direction of the central axis. In this case, the image formed by the optical modulator of a light non-emitting type can be projected to a screen, etc. and interpolation of the branched image lights becomes appropriate by setting refractive index characteristics, sizes of both the birefringent light branching elements, etc. Further, the black matrix portion arranged in the optical modulator becomes inconspicuous.

Further, in another exemplary aspect of the present invention, the projector further includes a polarizing state adjusting member to adjust a polarizing state of the image light incident to the first birefringent light branching element with respect to the distribution of a component of the predetermined direction and a component of the direction perpendicular to the predetermined direction. In this case, the intensity ratio of the image light branched by the first and second birefringent light branching elements can be comparatively accurately adjusted in accordance with the above distribution. The branch of the image light using both the birefringent light branching elements can be set to a predetermined desirable intensity ratio (e.g. 1:1).

Further, in another exemplary aspect of the present invention, the polarizing state adjusting member has a wavelength plate, and adjusts the polarizing state of the image light by setting the rotating position of the reference azimuth of the wavelength plate around the central axis. In this case, the polarizing state of the image light incident to both the birefringent light branching elements can be adjusted to a predetermined desirable state by a simple operation in which the rotating position of the wavelength plate is set.

In another exemplary aspect of the present invention, the projector further includes a control device to change the existence of a branch of the image light by switching the second birefringent light branching element between the first and second states and operating this second birefringent light branching element. In this case, the projecting image can be automatically set to an appropriate state in accordance with the kind (analog, digital, etc.) of a signal input to the projector, an arbitrary operation, such as an image quality adjustment made by a user, etc., characteristics (polarization, color, etc.) of light emitted from the display device, etc.

Further, in another exemplary aspect of the present invention, the display device includes plural optical modulators arranged for each color and individually illuminated, and a light synthesizing member to synthesize and emit light modulated by the optical modulator. In this case, even when each optical modulator has a discrete pixel, a continuous color image having no joint of the pixel or inconspicuous in the joint, or a color image of high resolution can be switched and projected in a stable state by suitably operating both the birefringent light branching elements and burying the clearance of the pixel and projecting the image as it is.

Further, in another exemplary aspect of the present invention, the first and second birefringent light branching elements are sequentially arranged along an optical path on the forward side of the light synthesizing member. Here, "the forward side of the light synthesizing member" means the projecting optical system side of the light synthesizing member, and also means that both the birefringent light branching elements are arranged on the optical path of the image light from the light synthesizing member to the projecting optical system. In this case, the continuous color image having no joint of the pixel or inconspicuous in the joint can be projected in a stable state by merely arranging one set of the first and second birefringent light branching elements.

Further, in another exemplary aspect of the present invention, the first and second birefringent light branching elements are sequentially arranged along the optical path for each color on the backward side of the light synthesizing member on the forward side of each of the above plural optical modulators. Here, the forward side of the optical modulator means the light synthesizing member side of the optical modulator, and the backward side of the light synthesizing member means the optical modulator side of the light synthesizing member. As a result, both the birefringent light branching elements are arranged on the optical path of the image light from the optical modulator to the light synthesizing member. In this case, it is possible to individually erase the joint of the pixel every each color, or adjust its erasing degree so that the expression of the color image using the projector can be diversified.

BRIEF DESCRIPTION OF THE DRAWINGS

FIGS. 3A to 3D are schematics for explaining the arrangement of an optical element constituting a main device body;

FIGS. 5A and 5B are schematics for conceptually explaining the action of the BM removing unit;

DETAILED DESCRIPTION OF EXEMPLARY EMBODIMENTS

First Exemplary Embodiment Mode

The structure of a projector in accordance with a first exemplary embodiment mode of the present invention will next be explained with reference to the drawings.

Figure 1:
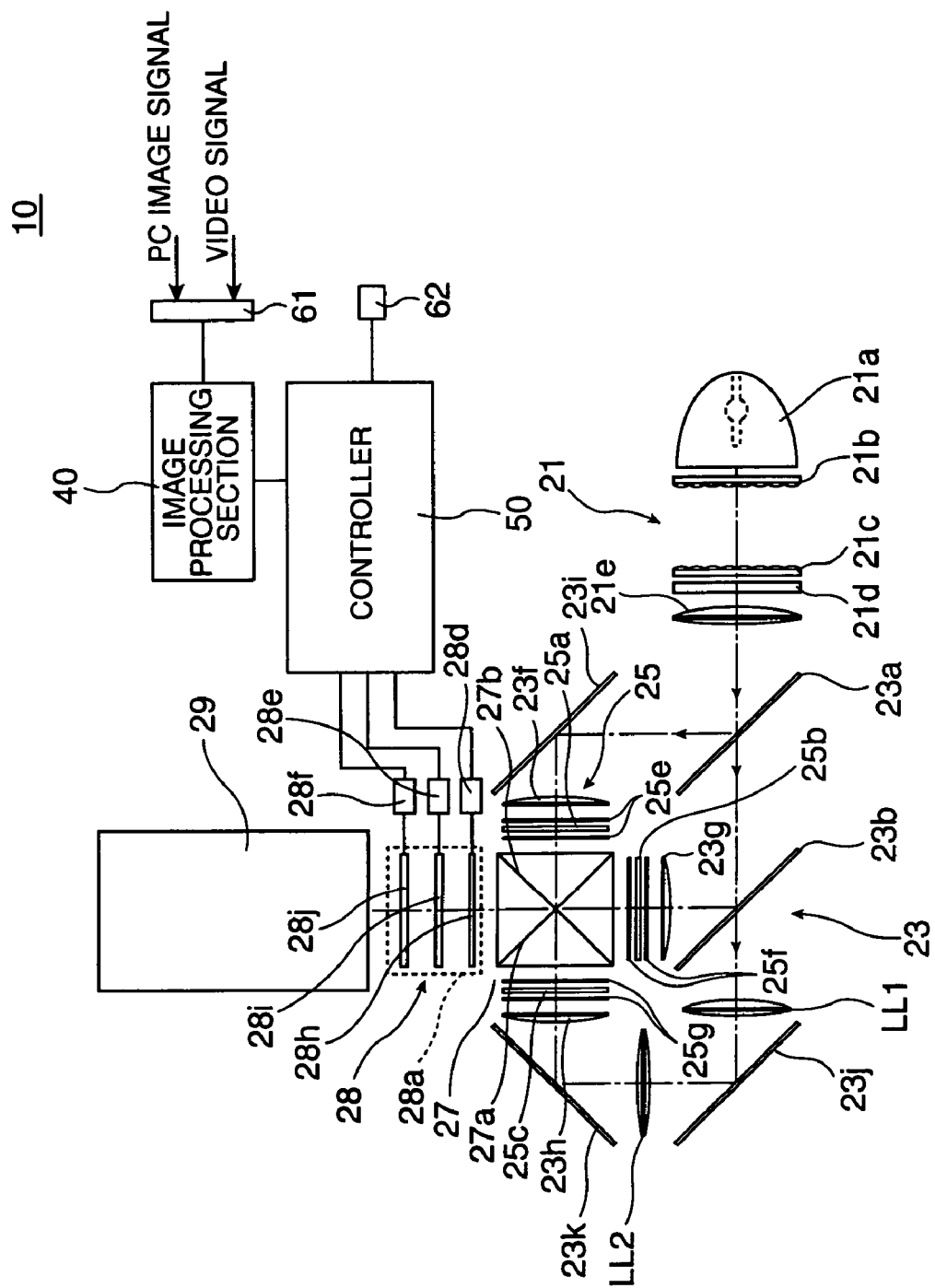
FIG. 1 is a schematic for explaining the optical system of a projector of a first exemplary embodiment mode.

FIG. 1 is a schematic for explaining an optical system of the projector of the first exemplary embodiment mode. This projector 10 has a light source device 21 to generate light source light, a light division optical system 23 to divide the light source light from the light source device 21 into three colors of RGB, and a light modulating section 25 illuminated by illumination light of each color emitted from the light division optical system 23. The projector 10 also has a light synthesizing optical system 27 to synthesize image light of each color from the light modulating section 25, a BM removing unit 28 to perform one kind of optical low pass filter processing with respect to the image light synthesized by the light synthesizing optical system 27 in its operating state, and a projecting lens 29 as a projecting optical system to project the image light transmitted via the BM removing unit 28 onto an unillustrated screen. The projector 10 further has an image processing section 40 to generate a driving signal with respect to a display device (described later in detail) of each color assembled into the light modulating section 25, and has a controller 50 to generally control the operation of the entire device by suitably operating the above light source device 21, the BM removing unit 28, the image processing section 40, etc.

The light source device 21 has a light source lamp 21a, a pair of fly eye optical systems 21b, 21c, a polarization converting member 21d and a superposing lens 21e. Here, for example, the light source lamp 21a is constructed by a high pressure mercury lamp, and has a concave mirror to collimate the light source light. The pair of fly eye optical systems 21b, 21c is constructed by plural element lenses arranged in a matrix shape, and divides the light source light from the light source lamp 21a by these element lenses, and individually converges and diverges the light source light. The polarization converting member 21d converts the light source light emitted from the fly eye 21c into only a P-polarized light component parallel to the paper face of FIG. 1 and supplies the P-polarized light component to the optical system of the next stage. The superposing lens 21e suitably converges the illumination light transmitted via the polarization converting member 21d as a whole, and enables superposing illumination of the display device of each color. Specifically, the illumination light transmitted via both the fly eye optical systems 21b, 21c and the superposing lens 21e uniformly superpose-illuminates the display device of each color arranged in the light modulating section 25, i.e., liquid crystal light valves 25a to 25c of the respective colors via the light division optical system 23 described below in detail.

The light division optical system 23 has first and second dichroic mirrors 23a, 23b, three field lenses 23f to 23h and reflecting mirrors 23i, 23j, 23k. The light division optical system 23 constitutes an illuminating device together with the light source device 21. The first dichroic mirror 23a reflects R-light among the three colors of RGB, and transmits G-light and B-light. Further, the second dichroic mirror 23b reflects the G-light among the two colors of GB and transmits the B-light. In this light division optical system 23, the R-light reflected on the first dichroic mirror 23a is incident to a field lens 23f to adjust an incident angle via the reflecting mirror 23i. The G-light passing through the first dichroic mirror 23a and reflected on the second dichroic mirror 23b is also incident to the similar field lens 23g. Further, the B-light passing through the second dichroic mirror 23b is incident to the field lens 23h to adjust the incident angle via relay lenses LL1, LL2 to compensate an optical path difference and the reflecting mirrors 23j, 23k.

The light modulating section 25 has three liquid crystal light valves 25a to 25c each set as a modulating unit or an optical modulating device, and three sets of polarizing filters 25e to 25g arranged so as to put the respective liquid crystal light valves 25a to 25c therebetween. The R-light reflected on the first dichroic mirror 23a is incident to the liquid crystal light valve 25a through the field lens 23f. The G-light transmitted through the first dichroic mirror 23a and reflected on the second dichroic mirror 23b is incident to the liquid crystal light valve 25b through the field lens 23g. The B-light transmitted through both the first and second dichroic mirrors 23a, 23b is incident to the liquid crystal light valve 25c through the field lens 23h. Each of the liquid crystal light valves 25a to 25c is a display device of an optical modulating type to modulate a spatial intensity distribution of the incident illumination light by rotation of the polarizing direction. Lights (P-polarized lights in the illustrated case) of the three colors respectively incident to the respective liquid crystal light valves 25a to 25c are modulated in accordance with a driving signal or an image signal input to each of the liquid crystal light valves 25a to 25c as an electric signal. In this case, the polarizing direction of the illumination light incident to each of the liquid crystal light valves 25a to 25c is adjusted by polarizing filters 25e to 25g, and modulating light (S-polarized light in the illustrated case) of a predetermined polarizing direction is taken out of the modulating light emitted from each of the liquid crystal light valves 25a to 25c.

Figure 2A:
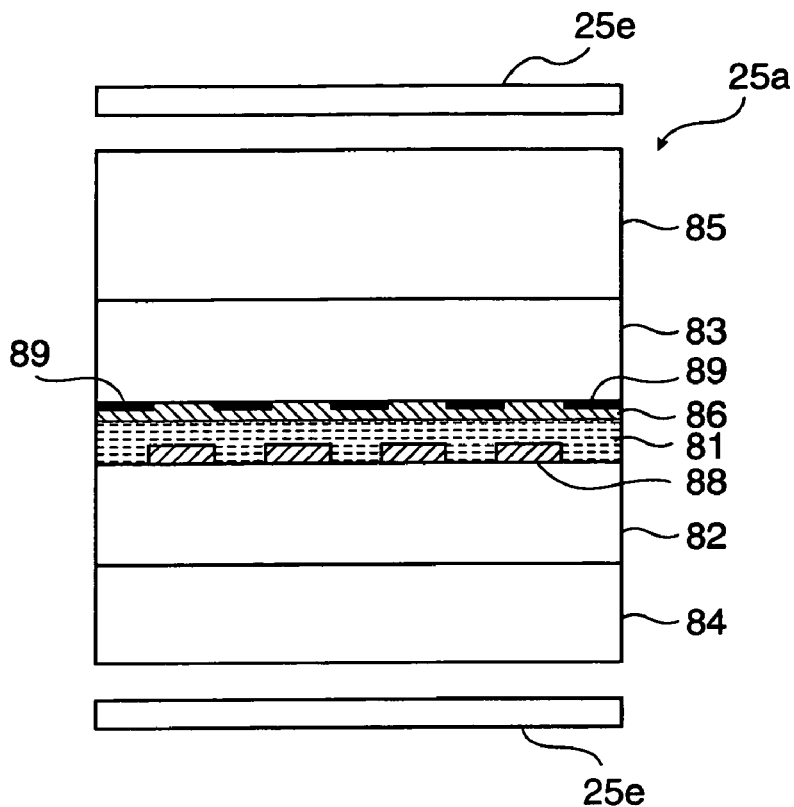
FIG. 2A is a schematic showing the construction of a liquid crystal light valve.
Figure 2B:
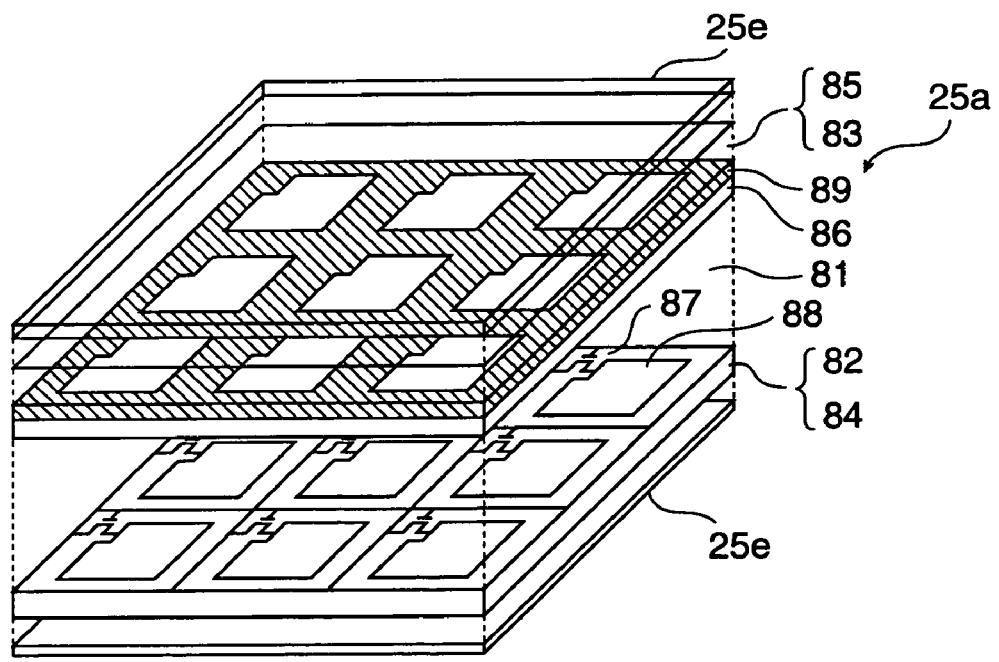
FIG. 2B is a schematic showing the construction of one portion of the liquid crystal light valve, etc.

FIG. 2A is a schematic showing the construction of the liquid crystal light valve 25a. FIG. 2B is a schematic showing the construction of one portion of the liquid crystal light valve 25a, etc. The liquid crystal light valve 25a has a transparent emitting side substrate 82 and a transparent incident side substrate 83 through a liquid crystal layer 81. The liquid crystal light valve 25a also has an emitting side cover 84 and an incident side cover 85 stuck to the outsides of these substrates by an optical adhesive. A transparent common electrode 86 is arranged on the face of the incident side substrate 83 on the liquid crystal layer 81 side. A thin film transistor 87 and a transparent pixel electrode 88 are arranged on the face of the emitting side substrate 82 on the liquid crystal layer 81 side. The thin film transistor 87 is arranged around plural pixel electrodes 88 arranged in a matrix shape, and is electrically connected to the pixel electrodes 88. Each pixel is constructed by one pixel electrode 88, the common electrode 86 and the liquid crystal layer 81 sandwiched between the pixel electrode 88 and the common electrode 86. A black matrix (light interrupting portion) 89 of a lattice shape is arranged between the incident side substrate 83 and the common electrode 86 so as to partition each pixel. This black matrix 98 has a function to interrupt the incidence of light to the thin film transistor and wiring. However, as a result, a dark portion of the lattice shape extending between the pixels is formed and becomes a cause of roughness of the image. A method to cope with this problem will be described later. Further, the emitting side substrate 82 and the incident side substrate 83 have an unillustrated orientation film to array a liquid crystal molecule constituting the liquid crystal layer 81. The liquid crystal light valve 25a having the above structure is called a liquid crystal device of an active matrix type. The liquid crystal light valve 25a of this exemplary embodiment mode is a liquid crystal device of a TN mode. The orientation film is formed such that an angle of about 90 degrees is formed between the arraying direction of the liquid crystal molecule on the emitting side substrate 82 side and the arraying direction of the liquid crystal molecule on the incident side substrate 83 side.

The incident side cover 85 and the emitting side cover 84 are arranged so as to set dust attached onto the surface of the liquid crystal light valve 25a to be inconspicuous on the projecting screen by shifting the position of the surface of the liquid crystal light valve 25a from the back focus position of the projecting lens 29 shown in FIG. 1. In this exemplary embodiment mode, the covers 85, 84 are respectively stuck to the incident side substrate 83 and the emitting side substrate 82. However, instead of these covers, it is also possible to make the substrates 83, 82 themselves have such functions of the covers by increasing the thicknesses of the substrates 83, 82 themselves. Further, these covers 85, 84 may be omitted since these covers 85, 84 have no influence on the modulating function. Further, only one of these covers 85, 84 may be also arranged.

For example, a microlens array can be arranged between the incident side substrate 83 and the incident side cover 85. Such a microlens array has plural microlenses to converge light to each pixel so that utilization efficiency of the light can be enhanced.

Further, in FIGS. 2A and 2B, the black matrix 89 is typically arranged. In reality, with respect to the black matrix 89, there is a case in which the black matrix 89 is formed as a light interrupting film in one of the emitting side substrate 82 and the incident side substrate 83, and a case in which the black matrix 89 is formed by combining the light interrupting films respectively arranged in both the substrates 82 and 83.

In the above description, the structure of the liquid crystal light valve 25a for R-light has been explained. The liquid crystal light valves 25b, 25c of the other colors also have a similar structure, and explanations about these liquid crystal light valves 25b, 25c are therefore omitted here.

In FIG. 1, the cross dichroic prism 27 is an optical synthesizing member, and a dielectric multilayer film 27a for R-light reflection and a dielectric multilayer film 27b for B-light reflection are built in the cross dichroic prism 27 in a state in which these dielectric multilayer films 27a and 27b are perpendicular to each other. The R-light from the liquid crystal light valve 25a is reflected on the dielectric multilayer film 27a and is emitted on the right-hand side in an advancing direction. The G-light from the liquid crystal light valve 25b is transmitted straight and is emitted through the dielectric multilayer films 27a, 27b. The B-light from the liquid crystal light valve 25c is reflected on the dielectric multilayer film 27b and is emitted on the left-hand side in the advancing direction. Thus, synthesizing light, synthesized by the cross dichroic prism 27, is incident to the projecting lens 29 through the BM removing unit 28.

The BM removing unit 28 has an optical unit 28a able to execute one kind of optical low pass filter processing with respect to the incident image light. The BM removing unit 28 also has actuators 28d to 28f to appropriately operate the optical unit 28a by suitably rotating an optical member assembled into this optical unit 28a around the optical axis. Here, the optical unit 28a has a λ/2 phase difference plate 28h to rotate the polarizing direction of the image light emitted from the cross dichroic prism 27 by a predetermined desirable amount. The optical unit 28a also has a first birefringent plate 28i to branch the optical path of the image light by a birefringent action and normally used in a fixing state. The optical unit 28a further has a second birefringent plate 28j to branch the optical path of the image light as assistant by the birefringent action in accordance with a situation and normally used in a movable state. The λ/2 phase difference plate 28h functions as a polarizing state adjusting member to adjust the polarizing state of the image light, i.e., the direction of a polarizing plane by setting the rotating position of the λ/2 phase difference plate 28h itself. Further, the first birefringent plate 28i functions as a first birefringent light branching element to branch the image light in accordance with the polarizing state of the image light and partially causing a pixel shift. Further, the second birefringent plate 28j functions as a second birefringent light branching element for further branching the image light of a specific polarizing direction in cooperation with the first birefringent plate 28i in a first state and completing the pixel shift so as to bury the clearance of the pixels. Further, the second birefringent plate 28j is operated so as to cancel the action of the first birefringent plate 28i in a second state, and passes the image light in a state in which there is no pixel shift as if no BM removing unit 28 exists. For example, both the birefringent plates 28i and 28j are manufactured by processing a material of crystal, lithium niobate, calcite, sapphire, etc. The actuator 28f functions as a control device to set whether the black matrix is erased or not together with the controller 50. Specifically, the state setting as to whether the pixel shift utilizing the branching of the image light is made or not by the BM removing unit 28 can be performed by switching the second birefringent plate 28j by the actuator 28f between the first state and the second state. In addition, the actuator 28d is utilized to adjust the intensity ratio of the image light branched in making the pixel shift to a target value. The actuator 28e is utilized to change setting of a direction to make the pixel shift.

FIGS. 3A to 3D are schematics for explaining the arrangements of the λ/2 phase difference plate 28h and the first and second birefringent plates 28i, 28j. In FIGS. 3A to 3D, the Z-direction, perpendicular to the paper face, is the optical axis direction (i.e., the direction of the central axis of an incident light beam as the image light) of the projector 10 of FIG. 1. The X-direction corresponds to the transversal direction of the projecting screen, and the Y-direction corresponds to the longitudinal direction of the projecting screen. The X, Y and Z directions are perpendicular to each other. FIG. 3A shows the arrangement corresponding to the optic axis in a reference azimuth SD1 of the λ/2 phase difference plate 28h. FIG. 3B shows the arrangement in which the optic axis corresponds to the azimuth inclined with respect to the optical axis perpendicular to the paper face in a reference azimuth SD2 of the first birefringent plate 28i. FIG. 3C shows the arrangement in which the optic axis corresponds to the azimuth inclined with respect to the optical axis in a reference azimuth SD3 of the second birefringent plate 28j set to the first state. FIG. 3D shows the reference azimuth SD4 of the second birefringent plate 28j set to the second state. As can be seen from these figures, the reference azimuth SD1 of the λ/2 phase difference plate 28h has an angle of 22.5° with respect to the horizontal direction of 0°, and the S-polarized light and the P-polarized light emitted from the cross dichroic prism 27 are rotated 45° so that polarization of a 45° inclining state can be set. The reference azimuth SD2 of the first birefringent plate 28i has an angle of 90° with respect to the horizontal direction of 0°, and abnormal light can be branched in the Y-direction with respect to normal light going straight along the optical axis. Further, with respect to the second birefringent plate 28j, the reference azimuth SD4 has an angle of 90° with respect to the horizontal direction of 0° in the first state of the second birefringent plate 28j, and the abnormal light can be branched in the +Y direction with respect to the normal light straightly going along the optical axis. In the second state of the second birefringent plate 28j, the reference azimuth SD4 has an angle of −90° with respect to the horizontal direction of 0°, and the abnormal light can be branched in the −Y direction with respect to the normal light going straight along the optical axis. Specifically, the second birefringent plate 28j has an action to perform the light branching or the optical path shift in the reverse direction in the first and second states. In such switching of the first and second states, it is sufficient for the second birefringent plate 28j to rotate its reference azimuth SD4 by 180°. Specifically, since the switching can be performed by merely rotating the second birefringent plate 28j in its place, the projector 10 can be easily made compact in comparison with a case in which the first birefringent plate 28i is slid and escaped from the optical path. Further, since the first and second birefringent plates 28i, 28j are always arranged on the optical path, the projecting state using the projecting lens 29 can be constantly held in the switching of image quality.

Figure 4A:
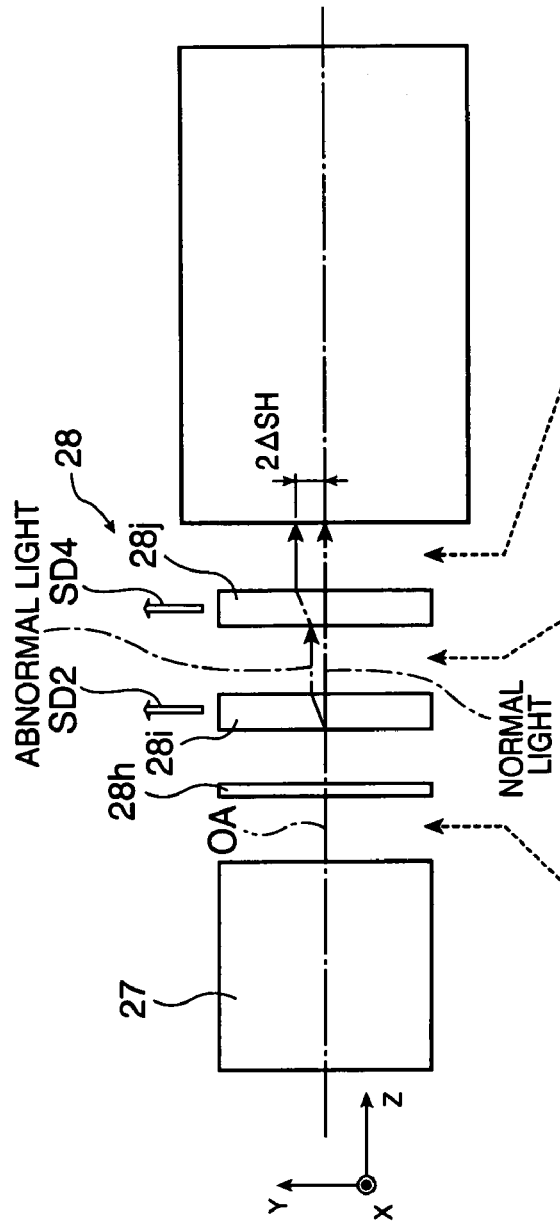
FIGS. 4A and 4B are schematics for conceptually explaining the action of a BM removing unit.
Figure 4B:
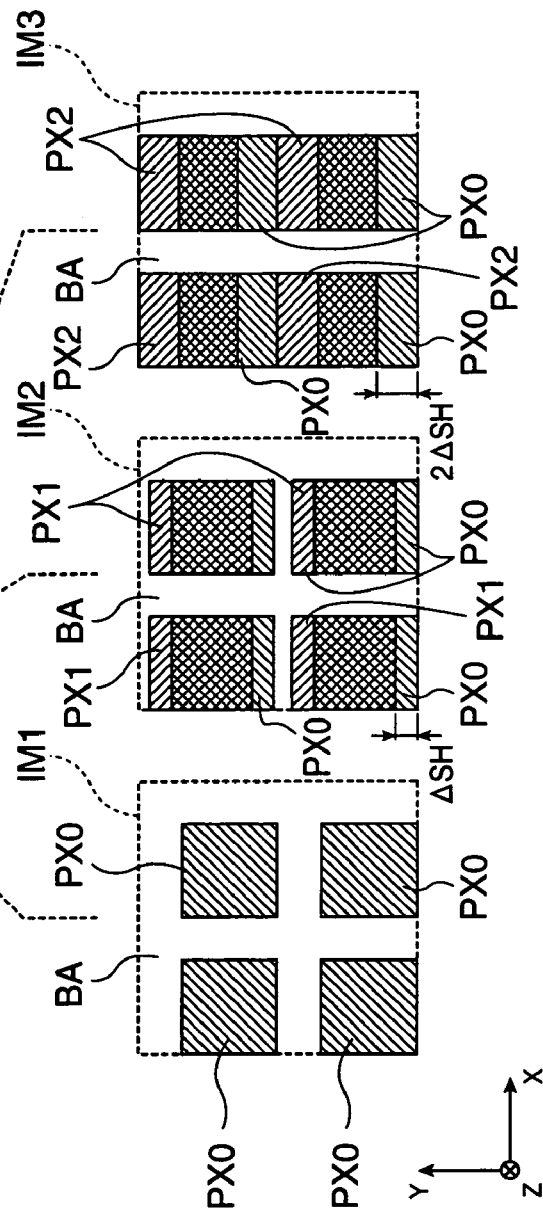

FIGS. 4A and 4B are schematics for conceptually explaining the action of the BM removing unit 28. First, FIG. 4A shows the arrangement relation of members within the optical unit 28a of the BM removing unit 28. FIG. 4B is a schematic for explaining image processing in each position within the BM removing unit 28. The image light emitted from the cross dichroic prism 27 is provided by synthesizing RGB lights from the respective liquid crystal light valves 25a to 25c (see FIG. 1). When this image light is projected as it is, an image IM1 constructed by plural pixels PX0 two-dimensionally arrayed and a black matrix area BA formed in a lattice shape between the respective pixels PX0 is formed on the screen arranged on the forward side of the projecting lens 29. Further, with respect to the image light passing through the first birefringent plate 28i, the polarizing direction is suitably rotated around the optical axis OA by the $\lambda/2$ phase difference plate 28h and one portion of the image light is branched in the Y-direction on the upper side by the first birefringent plate 28i. When this image light is projected as it is, an image IM2 constructed by the plural pixels PX0 two-dimensionally arrayed, the pixel PX1 corresponding to its branching image and the black matrix area BA is formed on the screen. The pixel PX1 formed by the branching is a pixel shift image in which the pixel X0 corresponding to the normal light is moved by a shift amount $\Delta SH$ in the Y-direction. As a result of overlapping of such a pixel, the width (i.e., the width of a line extending in the X-direction) of the black matrix area BA with respect to the Y-direction is reduced. In the illustrated example, the shift amount of the branching image is set to about a half of the width of the black matrix area BA, but is not limited to about the half of this width. The shift amount can be also set to the half width or less of the black matrix area BA, or this half width or more. Further, with respect to the image light passing through the second birefringent plate 28j set to the first state, an image light portion branched by the first birefringent plate 28i is further branched in the Y-direction. An image IM3 constructed by the original pixel PX0, the pixel PX2 corresponding to its branching image, and the black matrix area BA is formed on the screen. The pixel PX3 formed by the branching is a pixel shift image in which the branching image of the pixel X0 corresponding to the normal light is moved by a shift amount $2\Delta SH$ in the Y-direction. As a result of overlapping of such a pixel, the pixel is apparently enlarged and the width with respect to the Y-direction among the lattice of the black matrix area BA is further reduced. In the illustrated example, the shift amount of the branching image using each of the birefringent plates 28i, 28j is set to about half of the width of the black matrix area BA, and no width with respect to the Y-direction among the lattice of the black matrix area BA substantially exists. In this case, the shift amount of the branching image using each of the birefringent plates 28i, 28j can be set to the half width or less of the black matrix area BA, or this half width or more. Specifically, the final shift amount of the pixel is not limited to an amount equal to the width of a lattice line of the black matrix area BA, but may be an arbitrary amount or this lattice line width or more or the lattice line width or less. Both the shift amounts of the branching images using the birefringent plates 28i, 28j are set to the half of "an arbitrary final shift amount". Specifically, the black matrix area BA can be suitably compensated with respect to the Y-direction by suitably branching and overlapping the original pixel PX0. The black matrix of the lattice shape is finally greatly vanished from the image projected on the screen by the projecting lens 29, and a rough feeling of the image can be restrained.

FIGS. 5A and 5B are schematics for conceptually explaining the action of the BM removing unit 28 when the second birefringent plate 28j is switched from the first state to the second state. FIG. 5A shows the arrangement relation of members within the optical unit 28a of the BM removing unit 28. FIG. 5B is a schematic for explaining image processing in each position within the BM removing unit 28. In this case, the operations until light passes through the first birefringent plate 28i are similar to those in the cases of FIGS. 4A and 4B. However, with respect to the image light passing through the second birefringent plate 28j switched from the first state of a rotating angle 0° to the second state of a rotating angle 180°, the image light once branched by the first birefringent plate 28i is returned in the −Y direction. As this result, an image constructed by the black matrix area BA and an image provided by overlapping this branching image with the original pixel PX0 is formed on the screen. Specifically, the same image IM3' as the original image IM1 is formed on the screen. Specifically, the branch of the original pixel PX0 using the first birefringent plate 28i is canceled by the second birefringent plate 28j. The image finally projected onto the screen by the projecting lens 29 becomes a projecting image of a high resolution feeling in which the original black matrix is clearly left.

Figure 6A:
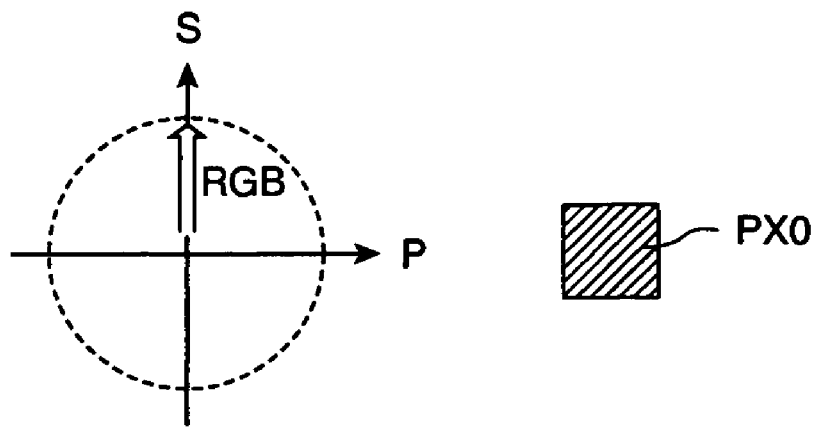
FIGS. 6A to 6C are schematics for concretely explaining the function of a first unit.
Figure 6B:
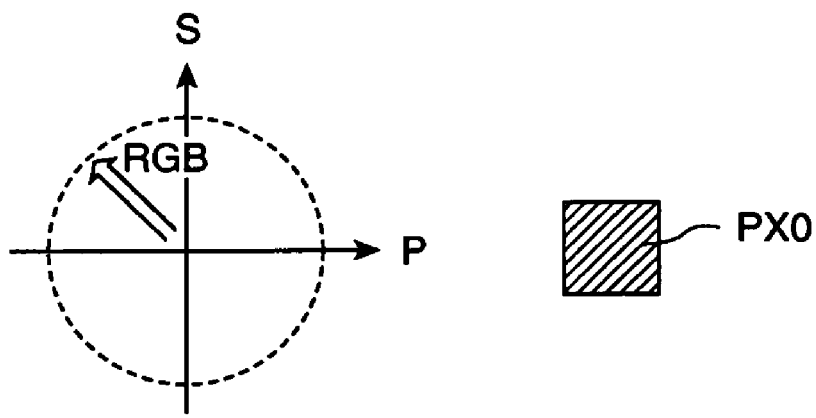
Figure 6C:
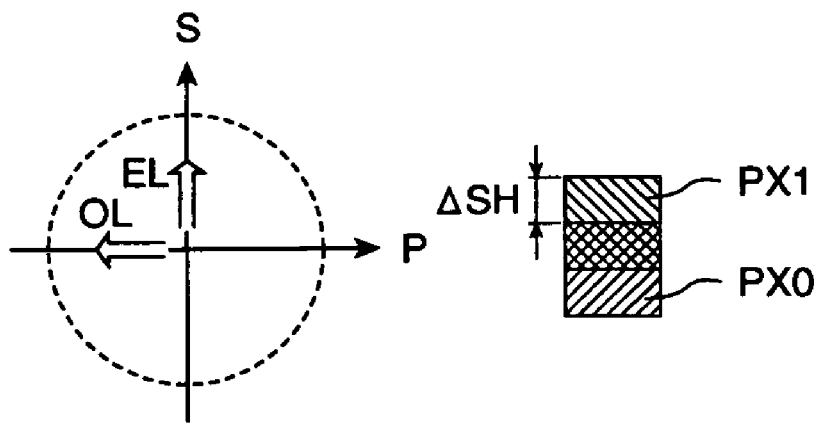

FIGS. 6A to 6C are schematics for concretely explaining the functions of the $\lambda/2$ phase difference plate 28h and the first birefringent plate 28i at the first half stage within the BM removing unit 28. As shown in FIG. 6A, the image light, before the incidence to the BM removing unit 28, is constructed by R-light, G-light and B-light of the S-polarizing state. As shown in FIG. 6B, the polarizing plane is rotated 45° in each color of the R-light, the G-light and the B-light by the incidence to the first $\lambda/2$ phase difference plate 28h. Further, as shown in FIG. 6C, the R-light, the G-light and the B-light are spatially suitably branched into normal light OL and abnormal light EL by the incidence to the next first birefringent plate 28i. Accordingly, it is possible to obtain the original pixel PX0 and the pixel PX1 of a branching image moved by the shift amount ASH with respect to this original pixel PX0. In the above description, the polarizing planes of the RB lights and the G-light are rotated 45° by the $\lambda/2$ phase difference plate 28h. Accordingly, the intensity ratio of the normal light and the abnormal light, i.e., the intensity ratio of each brightness of the zeroth order pixel PX0 and the branched primary pixel PX1 can be approximately set to 1:1.

Figure 7:
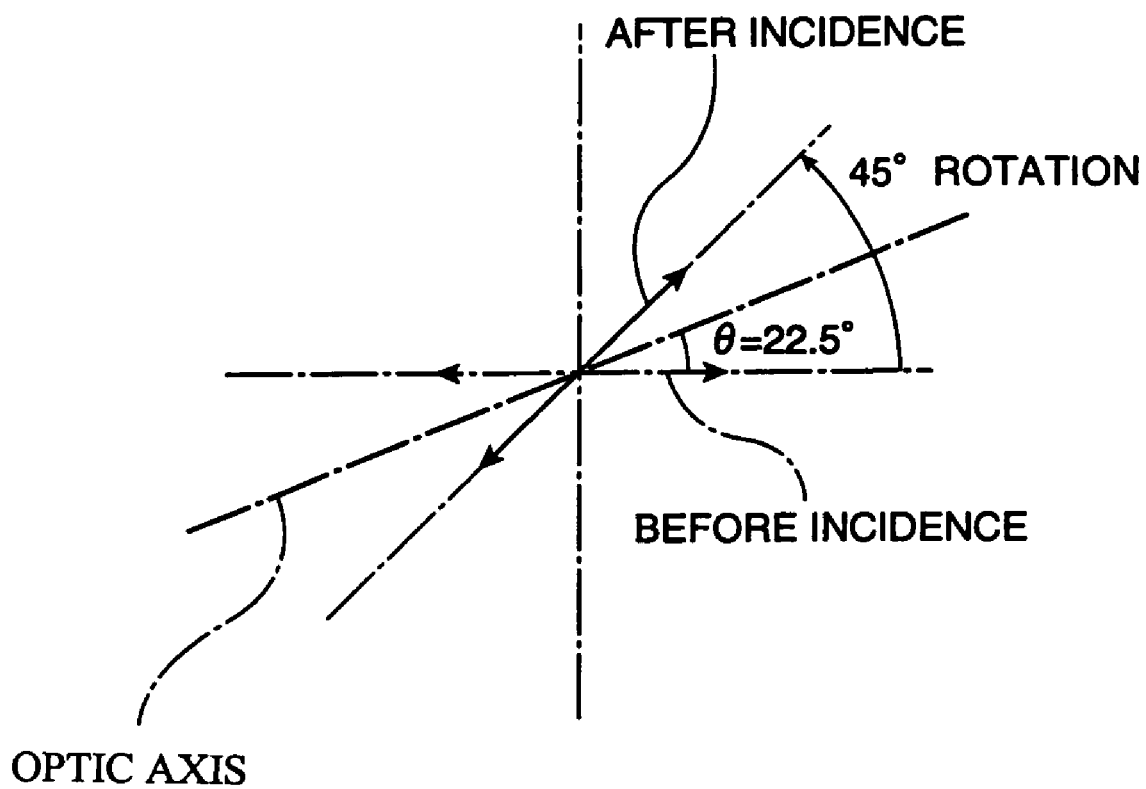
FIG. 7 is a schematic for concretely explaining the function of a λ/2 phase difference plate

FIG. 7 is a schematic for concretely explaining the function of the $\lambda/2$ phase difference plate 28h. When the optical axis of the $\lambda/2$ phase difference plate 28h is inclined at an inclination angle $\theta=22.5°$ with respect to the direction of the S-polarized light, the polarizing plane of the S-polarized light is rotated $2\theta=45°$ and both polarized components of SP are obtained as a result. When the $\lambda/2$ phase difference plate 28h is inclined at an inclination angle $\theta=112.5°$, the S-polarized light can be also rotated 45° and the P-polarized light component can be generated from the S-polarized light.

In FIG. 1, the image processing section 40 outputs a driving signal to each of the liquid crystal light valves 25a to 25c arranged in the optical modulating section 25. A digital image signal from a personal computer and a video image signal from a video regenerator, etc. are selectively input to the image processing section 40 through a switching device 61. In the image processing section 40, the driving signal output to each of the liquid crystal light valves 25a to 25c is generated by judging the contents of the image signal. In this case, the existence of erasion of the black matrix area BA and the degree of the erasion can be suitably adjusted by suitably operating the actuator 28f, etc. according to whether the contents of the image signal, i.e., the image signal is a digital image signal or a video image signal. For example, when the digital image signal is input, a clear image of a high resolution feeling is projected while leaving the black matrix area BA by setting the BM removing unit 28 (switching the second birefringent plate 28j to the second state). In contrast to this, when the video image signal is inputted, a smooth image is projected while the high resolution is maintained by reducing the black matrix area BA by setting the BM removing unit 28 (switching the second birefringent plate 28j to the first state). When the black matrix area BA is reduced, its reducing or erasing degree can be adjusted in accordance with the kind of the image signal and the kind of the image (e.g., whether it is an image dominant in white or not, whether it is a sliding image or not, etc.). Specifically, the polarizing plane of the image light can be arbitrarily set in the range of 0° to 45° by suitably changing the position of the optical axis of the λ/2 phase difference plate 28h, i.e., the angle of the optical axis with respect to the polarizing direction of an incident light beam in the range of e.g., 0° to 22.5°. The intensity ratio of the normal light and the abnormal light, i.e., the intensity ratio of the zeroth order pixel PX0 and the branched pixel PX2 can be arbitrarily set in the range of 0 to 0.5. Specifically, interpolation can be performed so as to vanish the black matrix existing in the original image to a predetermined desirable degree by branching the image constructed by the original discrete image group in an arbitrary intensity ratio and mutually shifting this image at a distance of a pixel pitch or less. In the above example, the intensity ratio of the normal light and the abnormal light, i.e., the intensity ratio of the original image and the branching interpolating image is set in accordance with the contents of the image signal. However, the intensity ratio of the original image and the branching interpolating image can be also set by utilizing an operation panel 62 arranged around the projector 10. In this case, a user selects at the user's own will (1) a clear image of a high resolution feeling although the black matrix area BA is left, and (2) a smooth image while the black matrix area BA is vanished and high resolution is maintained. The user can then project one of these images or its intermediate image onto the screen.

The controller 50 can adjust brightness, etc. of the image projected onto the screen by controlling the operation of the light source device 21 by an electric power adjustment of a lamp, etc. Further, the controller 50 can adjust the state of the image projected onto the screen by adjusting the state of a diaphragm arranged on the optical path reaching the projecting lens 29 via the light source device 21 and the light division optical system 23. Further, the controller 50 can adjust the state of the image projected onto the screen by processing an input image signal by the image processing section 40. A general image quality adjustment can be made by combining the image quality adjustment of the above projecting image with the above black matrix erasion.

In the above explanation, the pixel PX2 of the branching image is formed by shifting the branching light of the pixel PX0 in the Y-direction. However, the pixel of the branching image can be also formed by shifting the branching light of the pixel PX0 in the X-direction and another angle. In this case, the reference azimuth SD2 of the first birefringent plate 28i is set in the forming direction of the branching image by suitably operating the actuator 28e. Further, the reference azimuth SD4 of the second birefringent plate 28j is conformed to the above reference azimuth SD2 in its first state, and is set to the direction opposed to the above reference azimuth SD2 in its second state by suitably operating the actuator 28f.

The operation of the projector 10 in accordance with the first exemplary embodiment mode will next be explained. The light source light from the light source device 21 is divided in color by the first and second dichroic mirrors 23a, 23b arranged in the light division optical system 23, and is respectively incident to the corresponding liquid crystal light valves 25a to 25c as illumination light. Each of the liquid crystal light valves 25a to 25c has a two-dimensional refractive index distribution modulated by an image signal from the exterior, and modulates the illumination light in a two-dimensional space in a pixel unit. Thus, the illumination light modulated by each of the liquid crystal light valves 25a to 25c, i.e., the image light is incident to the projecting lens 29 via the BM removing unit 28 after the image light is synthesized by the cross dichroic prism 27. The image light incident to the projecting lens 29 is projected to the unillustrated screen. In this case, the BM removing unit 28 is arranged between the light synthesizing optical system 27 and the projecting lens 29. Accordingly, for example, the black matrix can be erased and originally returned from the projecting image with respect to the longitudinal direction perpendicular to the paper face of FIG. 1, and the erasing degree of the black matrix can be also adjusted in accordance with necessity. Specifically, it is possible to cause a pixel shift to bury the clearance of the original pixel PX0 and return the pixel shift to the original state by setting the rotating position of the λ/2 phase difference plate 28h, and the characteristics and the rotating positions of the first and second birefringent plates 28i, 28j. Thus, the image light can be projected in a stable state while a continuous smooth image inconspicuous in a joint and a clear image of a high resolution feeling are switched. Further, it is possible to restrain generation of a reduction in brightness and brightness irregularities in the projection.

Second Exemplary Embodiment Mode

Figure 8:
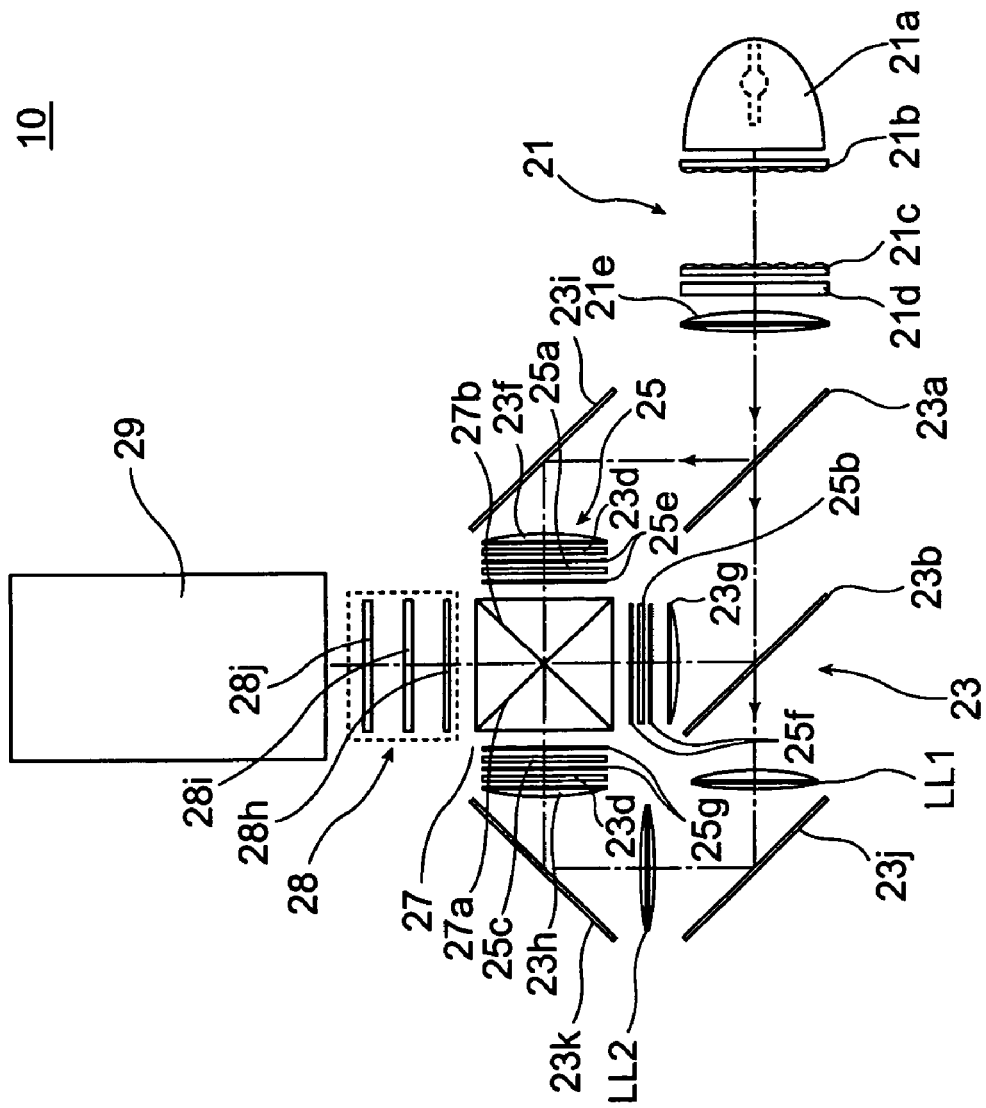
FIG. 8 is a schematic for explaining a projector of a second exemplary embodiment mode.

FIG. 8 is a schematic for explaining a projector of a second exemplary embodiment mode. The projector of the second exemplary embodiment mode is formed by modifying the projector of the first exemplary embodiment mode. The same portions of the projector as the first exemplary embodiment mode are designated by the same reference numerals, and their overlapping explanations are omitted here. Further, portions particularly unexplained can be constructed similarly to those in the first exemplary embodiment mode.

In this case, the image light emitted from the liquid crystal light valves 25a, 25c for RB lights is set to S-polarized light vibrated in the direction perpendicular to the incident face perpendicular to both the dielectric multilayer films 27a, 27b. However, the image light emitted from the liquid crystal light valve 25b for G-light is set to P-polarized light vibrated within the above incident face. Therefore, the light source light taken out of the light source device 21 is set to the S-polarized light perpendicular to the paper face. The λ/2 phase difference plate 23d for R-light is arranged between the field lens 23f and the liquid crystal light valve 25a, and the λ/2 phase difference plate 23d for B-light is arranged between the field lens 23h and the liquid crystal light valve 25c. Thus, the R-light of the S-polarized light reflected on the first dichroic mirror 23a is converted into P-polarized light by the λ/2 phase difference plate 23d via the reflecting mirror 23i and the field lens 23f. Only the S-polarized light component is taken out as modulating light via the liquid crystal light valve 25a. Further, the B-light of the S-polarized light passing through the first and second dichroic mirrors 23a, 23b is converted into P-polarized light by the λ/2 phase difference plate 23d via the relay lenses LL1, LL2, the reflecting mirrors 23j, 23k and the field lens 23h. Only the S-polarized light component is taken out as modulating light via the liquid crystal light valve 25c. With respect to the G-light of the S-polarized light reflected on the second dichroic mirror 23b, only the P-polarized light component is taken out as modulating light as it is via the field lens 23g and the liquid crystal light valve 25b.

The S-polarized light from the liquid crystal light valves 25a, 25c for RB lights is reflected on both the dielectric multilayer films 27a, 27b, and the P-polarized light from the liquid crystal light valve 25b for G-light is transmitted through both the dielectric multilayer films 27a, 27b by setting the above construction. Thus, even when edge wavelengths in the transmitting characteristics of both the dielectric multilayer films 27a, 27b with respect to the S-polarized light and the P-polarized light are different from each other, transmission efficiency of the G-light using both the dielectric multilayer films 27a, 27b can be raised while reflection efficiencies of the R-light and the B-light using both the dielectric multilayer films 27a, 27b are raised.

However, in this case, the RB lights incident to the BM removing unit 28 via the cross dichroic prism 27 become the S-polarized light, and the G-light incident to this BM removing unit 28 becomes the P-polarized light so that the polarizing directions are different from each other. Therefore, the polarizing plane of each color of RGB is rotated 45° by suitably setting a crystal axis azimuth of the λ/2 phase difference plate 28h arranged in the removing unit 28. The intensity ratio of the normal light and the abnormal light respectively branched by the pair of birefringent plates 28i, 28j is approximately set fixedly to 1:1.

Figure 9A:
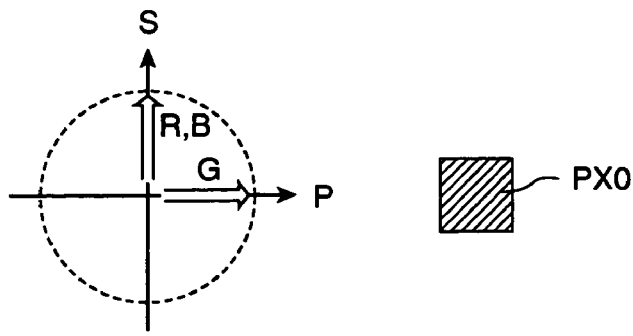
FIGS. 9A to 9D are schematics for concretely explaining the function of the first unit.
Figure 9B:
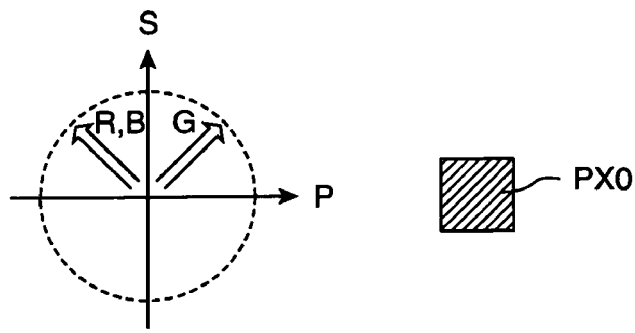
Figure 9C:
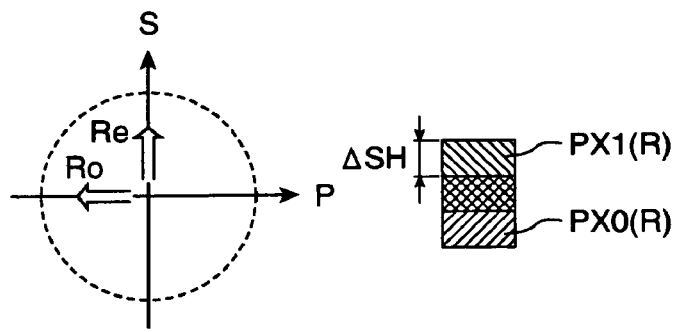
Figure 9D:
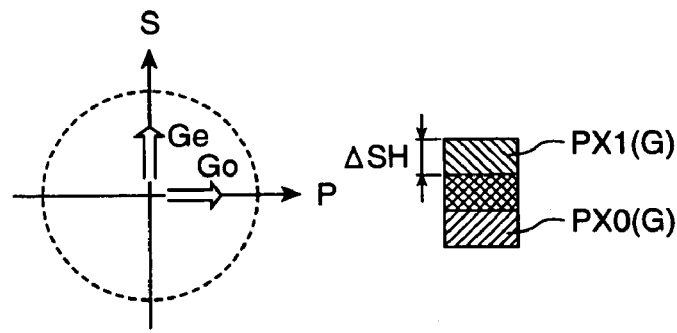

FIGS. 9A to 9D are schematics for concretely explaining the role of the first unit 28a of the first half stage within the BM removing unit 28. As shown in FIG. 9A, the image light before the incident to the BM removing unit 28 is constructed by the R-light and the B-light of the S-polarized light and the G-light of the P-polarized light. As shown in FIG. 9B, the polarizing planes of both the RB lights and the G-light are rotated 45° by the incidence to the first λ/2 phase difference plate 28h. As shown in FIG. 9C, the R-light and the B-light are suitably branched spatially into normal light Ro and abnormal light Re in an equal ratio by the incidence to the next first birefringent plate 28i. Accordingly, it is possible to obtain the original pixel PX0 and a pixel PX1 of a branching image of equal intensity moved by a shift amount ΔSH with respect to this original pixel PX0. In contrast to this, as shown in FIG. 9D, the G-light is also suitably branched spatially into normal light Go and abnormal light Ge in an equal ratio by the incidence to the first birefringent plate 28i. Accordingly, it is possible to obtain the original pixel PX0 and the pixel PX1 of the branching image of equal intensity moved by the shift amount ΔSH with respect to this original pixel PX0. Specifically, although the G-light has a different polarizing plane with respect to the R-light and the B-light, the intensity ratio of the normal light and the abnormal light, i.e., the intensity ratio of each brightness of the zeroth order pixel PX0 and the branched primary pixel PX1 can be approximately set to 1:1, and a similar pixel shift image can be obtained with respect to each color.

Figure 10A:
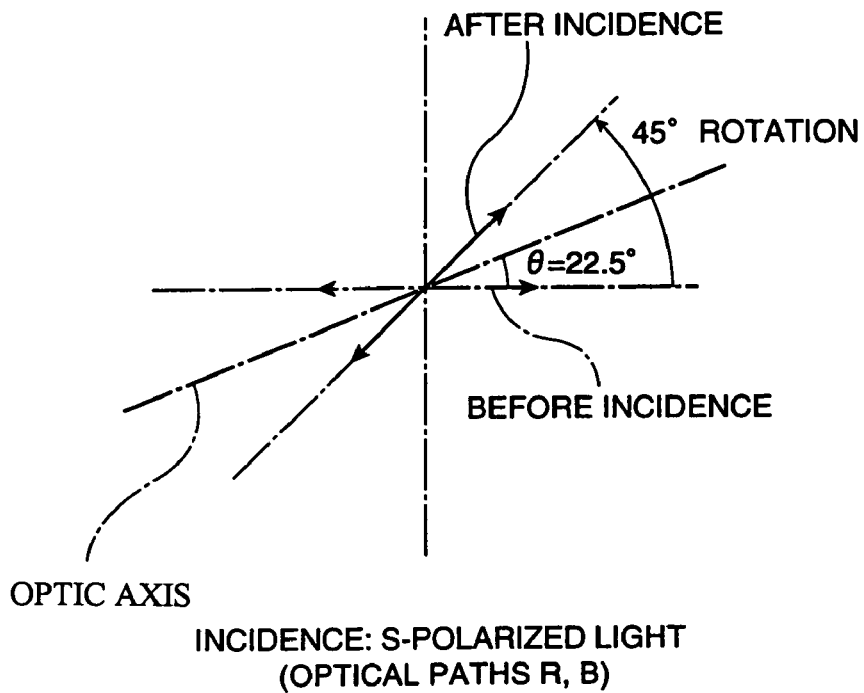
FIGS. 10A and 10B are schematics for concretely explaining the function of the λ/2 phase difference plate.
Figure 10B:
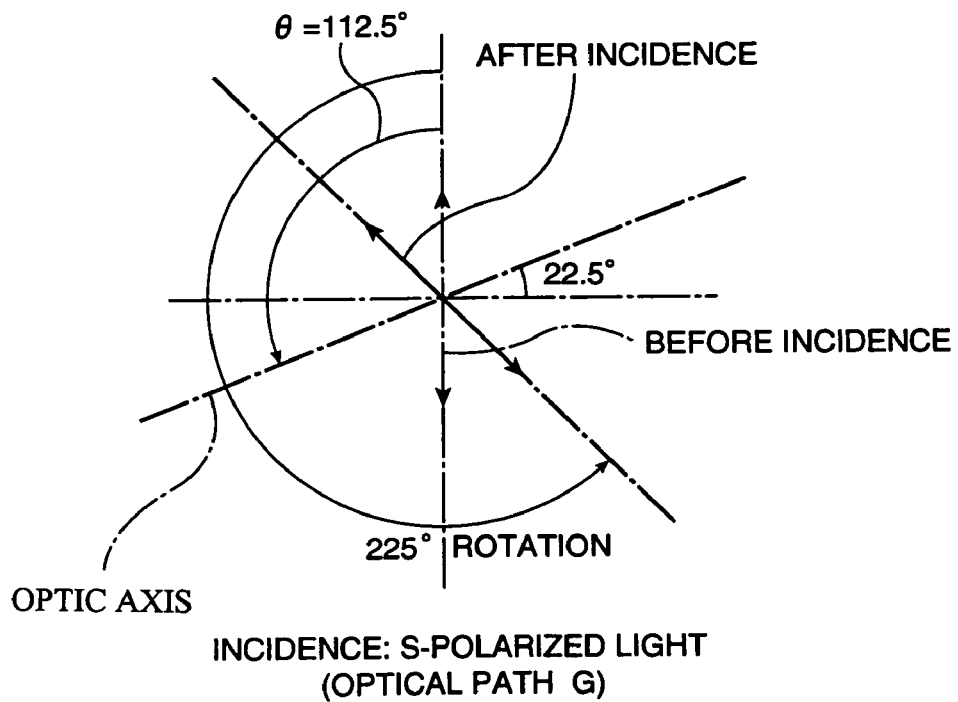

FIGS. 10A and 10B are schematics for concretely explaining the function of the λ/2 phase difference plate 28h in this exemplary embodiment mode. As shown in FIG. 10A, when the RB lights as the S-polarized light are incident to the λ/2 phase difference plate 28h set to an inclination angle θ=22.5°, the polarizing planes of the RB lights are rotated 2θ=45° and both the S-polarized and P-polarized light components are equally obtained. Further, as shown in FIG. 10B, when the G-light as the P-polarized light is incident to the λ/2 phase difference plate 28h set to an inclination angle θ=67.5° with respect to the P-polarizing direction, the polarizing plane of the G-light is rotated 2θ=22.5° or 45° and both the S-polarized and P-polarized light components are equally obtained.

Third Exemplary Embodiment Mode

Figure 11:
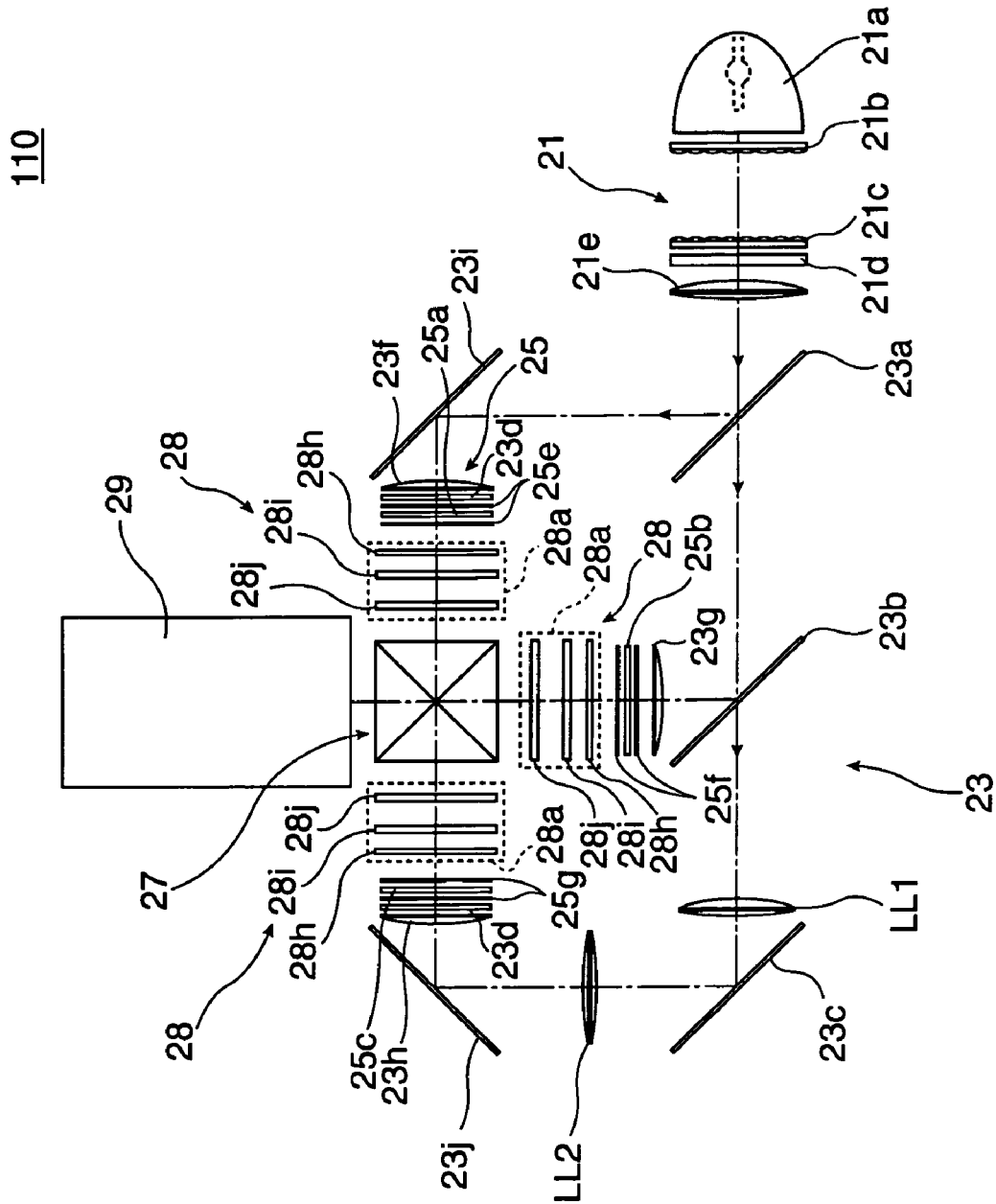
FIG. 11 is a schematic for explaining the optical system of a projector of a third exemplary embodiment mode.

FIG. 11 is a schematic for explaining a projector of a third exemplary embodiment mode. The projector of the third exemplary embodiment mode is formed by modifying the projector of the first exemplary embodiment mode. Portions particularly unexplained can be constructed similarly to those in the first embodiment mode.

This projector 110 has the BM removing unit 28 for each color of RGB at the first half stage of the cross dichroic prism 27. The black matrix area BA can be independently erased every each color of RGB by setting such a construction. Specifically, a various expression considering color characteristics can be also made since the ratio of branching light can be adjusted every each color of RGB and the shift amount of the branching light can be adjusted for each color of RGB. Actuators 28d to 28f (see FIG. 1) for operating the birefringent plates 28i, 28j and the λ/2 phase difference plate 28h are arranged for each BM removing unit 28 although these actuators are omitted in FIG. 11. Further, the light source light taken out of the light source device 21 is set to the S-polarized light perpendicular to the paper face, and the λ/2 phase difference plate 23d for R-light is arranged between the field lens 23f and the liquid crystal light valve 25a, and the λ/2 phase difference plate 23d for B-light is arranged between the field lens 23h and the liquid crystal light valve 25c. Thus, even when the edge wavelengths in the transmitting characteristics of both the dielectric multilayer films 27a, 27b with respect to the S-polarized light and the P-polarized light are different from each other, the transmission efficiency of the G-light using both the dielectric multilayer films 27a, 27b can be raised while the reflection efficiencies of the R-light and the B-light using both the dielectric multilayer films 27a, 27b are raised.

When the BM removing unit 28 is arranged in each of three portions of the first half stage of the cross dichroic prism 27 at the latter stage of each of the liquid crystal light valves 25a to 25c, the case that no intensity ratio of the original image and the pixel shift image is 1:1 in the projecting image is also caused by a polarization dependence property of the transmitting reflecting characteristics of both the dielectric multilayer films 27a, 27b arranged in the cross dichroic prism 27 even if light is branched into the P-polarized light and the S-polarized light in the branching intensity ratio 1:1 by each BM removing unit 28. In this case, the angle of the λ/2 phase difference plate 28h arranged in each of the three BM removing units 28 is finely adjusted for each color, and the pixel separation of the image finally projected is corrected and can be controlled to a predetermined desirable state while each color is balanced.

The above description relates to the explanation of the case of 1:1 in the intensity ratio of the original image and the pixel shift image. However, a similar situation is also formed when the intensity ratio of the original image and the pixel shift image is adjusted to a ratio different from 1:1. Thus, the change of an angle adjusting amount of the λ/2 phase difference plate 28h in a changing case of the intensity ratio of the original image and the pixel shift image can be stored to e.g., the controller 50 (see FIG. 1) as a table, and is referred in operating the actuators 28d to 28f (see FIG. 1).

This invention is not limited to the above exemplary embodiments and exemplary embodiment modes and can be executed in various modes in the range not departing from its gist. For example, the following modifications can be also used.

In the above first to third exemplary embodiment modes, the BM removing unit 28 is constructed by the single optical unit 28a, and the black matrix is removed with respect to one direction. However, the black matrix can be removed with respect to two directions by constructing the BM removing unit 28 by a pair of optical units 28a and performing one kind of optical low pass filter processing in the two directions perpendicular to each other. In this case, since the existence of the branch of the image light can be adjusted with respect to each direction, the projecting image of smooth image quality and the projecting image of high resolution can be displayed while these projecting images are switched in a stable state.

In the above explanation, the first and second birefringent plates 28i, 28j are formed in the same shape. However, when both the birefringent plates 28i, 28j are considerably separated from each other and are arranged, setting of the thicknesses of both the birefringent plates 28i, 28j, etc. can be changed in consideration of an influence of the difference in position on the optical axis between both the birefringent plates 28i, 28j.

In the above exemplary embodiment modes, the first and second birefringent plates 28i, 28j are sequentially arranged along the optical path, but the order of both the birefringent plates 28i, 28j can be also replaced.

In the above exemplary embodiment modes, the λ/2 phase difference plate 28h is assembled into the BM removing unit 28 as a polarizing state adjusting member. But a λ/4 phase difference plate, etc. can be used instead of the λ/2 phase difference plate 28h. In this case, the ratio of the light branch can be adjusted by adjusting the rotating position of the λ/4 phase difference plate around the optical axis, etc. A Faraday rotator can be also used as the polarizing state adjusting member instead of the phase difference plate.

In the above exemplary embodiment modes, the two fly eye optical systems 21b, 21c are used to divide the light of the light source lamp 21a into plural partial light beams. However, this invention can be also applied to a projector in which such a fly eye optical system, i.e., a lens array is not used.

In the above exemplary embodiment modes, the example of the projector using the three liquid crystal light valves has been explained. However, the present invention can be also applied to a projector using one, two, or four or more optical modulators such as the liquid crystal light valves. For example, when a color display panel of a type having filters of RGB arranged in each pixel in the single liquid crystal light valve, etc. is illuminated by a white light source, it is also possible to set and release the similar pixel shift (i.e., erasion processing of the black matrix) by using the BM removing unit 28 shown in FIG. 4A, etc.

In the above exemplary embodiment modes, the example of the applying case of the present invention to the projector of the transmission type has been explained. However, the present invention can be also applied to a reflection type projector. Here, the "transmission type" means a type in which the light value, such as the liquid crystal light valve, etc., transmits light therethrough. The "reflection type" means a type in which the light valve reflects light. In the case of the reflection type projector, the light valve can be constructed by only a liquid crystal panel, and a pair of polarizing plates is not required. Further, in the reflection type projector, there is a case in which the cross dichroic prism is utilized as a color light separating device to separate white light into lights of the three colors of red, green and blue, and is also utilized as a color light synthesizing device to again synthesizing modulate lights of the three colors and emit these lights in the same direction. Further, there is also a case using a dichroic prism constructed by combining plural dichroic prisms of triangular prism and square prism shapes instead of the cross dichroic prism. When this invention is applied to the projector of the reflection type, it is also possible to obtain effects approximately similar to those of the projector of the transmission type. The optical modulator is not limited to the liquid crystal light valve, but an optical modulator using e.g., a micro mirror may be also used.

As the projector, there are a front face projector to project an image from the observing direction of a projecting face, and a rear face projector to project an image from the side opposed to the observing direction of the projecting face. The constructions of the above exemplary embodiments can be applied to each of these projectors.

In the present invention, the black matrix of the optical modulator may be a black matrix to limit the emission of the image light in a periodic partial area, and is not limited to the black matrix formed by the light interrupting film as explained in the exemplary embodiment modes. For example, an optical modulator generating a joint between the pixels of the projecting image corresponds to the optical modulator having the black matrix even when no emission of the image light is positively limited by the light interrupting film, etc. as in the optical modulator using a micro mirror.

What is claimed is:

1. A projector, comprising:
a display device
a projecting optical system to form image light from the display device as an image;
a first birefringent light branching element arranged so as to set a reference azimuth to a predetermined direction around a central axis of an incident light beam on a forward side of the display device; and
a second birefringent light branching element having light branching characteristics corresponding to the first birefringent light branching element and arranged before or after the first birefringent light branching element, and able to be switched between a first state to set the reference azimuth to the predetermined direction around the central axis, and a second state to set the reference azimuth to a direction opposed to the predetermined direction by setting a rotating position around the central axis.

2. The projector according to claim 1, the display device being an optical modulator illuminated by illumination light from an illuminating device, and the optical modulator having a black matrix portion to limit emission of the image light in a periodic partial area, and the first and second birefringent light branching elements being birefringent plates having a thickness corresponding to an arrangement and a shape of the black matrix portion with respect to a direction of the central axis.

3. The projector according to claim 1, the projector further comprising:

a polarizing state adjusting member to adjust a polarizing state of image light incident to the first birefringent light branching element with respect to the distribution of a component of the predetermined direction and a component of a direction perpendicular to the predetermined direction.

4. The projector according to claim 3, the polarizing state adjusting member having a wavelength plate, and adjusting the polarizing state of the image light by setting the rotating position of the reference azimuth of the wavelength plate around the central axis.

5. The projector according to claim 1, the projector further comprising:

a control device to change the existence of a branch of the image light by switching the second birefringent light branching element between the first and second states and operating this second birefringent light branching element.

6. The projector according to claim 1, the display device including plural optical modulators arranged for each color and individually illuminated, and a light synthesizing member to synthesize and emit light modulated by the optical modulator.

7. The projector according to claim 6, the first and second birefringent light branching elements being sequentially arranged along an optical path on a forward side of the light synthesizing member.

8. The projector according to claim 6, the first and second birefringent light branching elements being sequentially arranged along an optical path for each color on a back side of the light synthesizing member on the forward side of each of the plural optical modulators.

* * * * *